United States Patent Office 2,847,451
Patented Aug. 12, 1958

2,847,451
GROWTH ACCELERATOR

Stuart Schott and Virgil L. Hansley, Cincinnati, Ohio, assignors to National Distillers and Chemical Corporation, a corporation of Virginia No Drawing. Application October 1, 1954
Serial No. 459,835

1 Claim. (Cl. 260—465.4)

This invention relates to a novel composition and a new and useful method for accelerating the growth of chicks.

It has been discovered that the growth of chicks is accelerated by administering as a part of the total intake (i. e., both solids and liquids consumed) the compound, acetyl methionine nitrile having the formula $$CH_3SCH_2CH_2CHNH(Ac)CN$$

By experimentation, it has been demonstrated that by the addition to the dietary intake of the chicks of 0.1% by weight of the above compound, based on the total amount of solid food supplied on an air dried basis, the growth can be accelerated by a value of 21.7% over the basal ration.[1] The acceleration of growth is sustained up to a maximum of about 0.3% of the compound.

While the amount to be added is predicated on the amount of solid food supplied, air dry basis, the actual introduction may be either in admixture with such foods or in solution in the water supplied to the chicks. The actual food efficiency, i. e., the gain in weight in relation to the total amount of food consumed, does not appear to be affected. The primary advantage in using the feed supplement is therefore that a greater output is obtainable in unit time from a single installation and since the chicks average larger, the ratio of fatty tissue to the bone and offal is greater.

It is further believed that the compound employed as a growth accelerator, acetyl methionine nitrile, is a new composition of matter and it is intended to claim it as such.

Examples shown below describe a typical method of preparation of the compound and the effects obtained by its use as a food supplement for chicks. The preparation of the compound is not, however, limited to the particular method described below. All parts are by weight unless otherwise specified.

Example 1

To 325 parts (1.9 moles) of aminated beta-methylmercaptopropionaldehyde cyanohydrin, (2-amino-4-methylmercaptobutanenitrile), were added 15 parts of triethyl amine and 290 parts of acetic anhydride. After the reaction had subsided, the mixture was distilled. The product distilled at 175° to 180° C./1 mm. and amounted to 297 parts. The distillate crystallized slowly. Recrystallization from ethyl ether gave 266 parts of solid product, M. P. 44–46° C.

*Analyses.*—Percent nitrogen, calc. 16.28, found 15.55; percent carbon, calc. 48.9, found 48.9; percent hydrogen, calc. 6.98, found 6.98 for $C_7H_{12}ON_2S$.

Example 2

As a specific example of feeding experiments, a group of 20 chicks were fed on a ration containing 45.4 grams of acetyl methionine nitrile per 100 pounds of food solids, air dry basis. This group was compared to a control group of 20 chicks which had no growth accelerator supplement added to their rations. At the expiration of 56 days, the group which had been fed the rations containing acetyl methionine nitrile showed an increased gain in weight of 21.7% as compared to the control group. In addition, two other groups of 20 chicks were studied, on a comparative basis. One group was fed rations to which methionine was added in 0.1% concentration. The other group was fed rations to which the sodium salt of hydroxymethionine was added in 0.1% concentration. On a molar equivalent basis, these experiments showed that the acetyl methionine nitrile was highly effective as a growth accelerator for chicks. Furthermore, a great economic advantage is achieved as a result of using this compound. The cost of producing acetyl methionine nitrile is approximately one-tenth that of methionine, giving this compound a five to one economic advantage over methionine. One of the chief disadvantages of methionine itself is that it is extremely difficult to isolate because of its high water solubility.

What is claimed is:

Acetyl methionine nitrile of the formula $$CH_3SCH_2CH_2CHNH(Ac)CN$$

wherein Ac is an acetyl radical.

References Cited in the file of this patent

UNITED STATES PATENTS 2,344,229    Block et al.             Mar. 14, 1944
2,745,745    Blake et al.             May 15, 1956

---
[1] Ration:

| | Mg./lb. |
|---|---|
| Corn | 60.07 |
| Soybean meal (44%) | 35.0 |
| Bone meal | 2.0 |
| Salt iodized | 1.0 |
| Limestone | 1.5 |
| A & D oil (3000 D–1500 A) | 0.4 |
| MnSO₄ | 0.03 |
| Riboflavin | 1.50 |